(12) United States Patent
Howe

(10) Patent No.: US 6,604,715 B2
(45) Date of Patent: Aug. 12, 2003

(54) EXTRUDED ACOUSTIC PIPE SUPPORT

(75) Inventor: Samuel H. Howe, Carson City, NV (US)

(73) Assignee: LSP Products Group, Inc., Carson City, NV (US)

( * ) Notice: Subject to any disclaimer, the term of this patent is extended or adjusted under 35 U.S.C. 154(b) by 0 days.

(21) Appl. No.: 09/910,064

(22) Filed: Jul. 23, 2001

(65) Prior Publication Data

US 2002/0070316 A1 Jun. 13, 2002

Related U.S. Application Data

(62) Division of application No. 09/475,551, filed on Dec. 30, 1999.

(51) Int. Cl.[7] .............................. E21F 17/02; F16L 3/00
(52) U.S. Cl. .................. 248/62; 264/173.12; 248/74.2
(58) Field of Search .......................... 248/58, 60, 62, 248/73, 74.1, 74.2, 74.3, 562, 611, 634; 138/106, 107; 52/39, 309.8, 723.2, 736.4, 737.5; 264/174.11, 173.12

(56) References Cited

U.S. PATENT DOCUMENTS

| | | | | |
|---|---|---|---|---|
| 2,317,825 A | * | 4/1943 | Teas, Sr. ..................... 248/71 |
| 3,035,297 A | * | 5/1962 | Overman et al. ........ 15/250.48 |
| 3,203,653 A | * | 8/1965 | Hall ............................. 248/62 |
| 3,219,302 A | * | 11/1965 | Smith ...................... 248/218.3 |
| 3,243,151 A | * | 3/1966 | Varney et al. ............. 248/74.1 |
| 3,244,388 A | * | 4/1966 | Coffman ...................... 248/62 |
| 3,312,442 A | * | 4/1967 | Moeller ................... 248/216.1 |
| 3,483,285 A | * | 12/1969 | Foley ......................... 264/146 |
| 3,511,007 A | * | 5/1970 | Babcock .................... 52/309.8 |
| 3,606,218 A | * | 9/1971 | Enlund et al. ............. 248/74.2 |
| 3,684,223 A | * | 8/1972 | Logsdon .................... 248/74.3 |
| 3,802,655 A | * | 4/1974 | Schuplin .................... 248/74.1 |
| 3,848,839 A | * | 11/1974 | Tillman ...................... 248/74.2 |
| 4,150,184 A | * | 4/1979 | Tesch ........................... 428/43 |
| 4,183,485 A | * | 1/1980 | Gladieux ..................... 24/336 |
| 4,227,668 A | * | 10/1980 | Ernst ......................... 248/317 |
| 4,318,518 A | * | 3/1982 | Davis ........................... 248/60 |
| 4,323,088 A | * | 4/1982 | McClellan .................. 138/106 |
| 4,340,557 A | * | 7/1982 | Gross ......................... 264/146 |
| 4,442,994 A | * | 4/1984 | Logsdon ..................... 248/547 |
| 4,509,713 A | * | 4/1985 | Hogg ......................... 248/546 |
| 4,530,478 A | * | 7/1985 | McClellan ................... 248/62 |
| 4,619,430 A | * | 10/1986 | Hogg ......................... 248/467 |
| 4,713,271 A | * | 12/1987 | Searl et al. ................ 428/36.5 |
| 4,772,507 A | * | 9/1988 | Leo et al. .................. 428/218 |
| 4,796,841 A | * | 1/1989 | Baker et al. ................. 248/60 |
| 4,808,450 A | * | 2/1989 | Guy ............................. 428/31 |
| 4,934,635 A | * | 6/1990 | Sherman ................... 248/74.1 |
| 5,002,243 A | * | 3/1991 | Kraus et al. ............... 248/68.1 |
| 5,028,030 A | * | 7/1991 | Lewis ........................ 248/493 |
| 5,149,037 A | * | 9/1992 | Smith ...................... 248/216.1 |
| 5,226,892 A | * | 7/1993 | Boswell ..................... 604/180 |
| 5,277,387 A | * | 1/1994 | Lewis et al. ............... 248/74.2 |
| 5,300,355 A | * | 4/1994 | Mifune et al. .............. 428/215 |
| 5,324,461 A | * | 6/1994 | Grohman ................... 264/45.9 |
| 5,385,320 A | * | 1/1995 | Ismert et al. ................. 248/62 |

(List continued on next page.)

*Primary Examiner*—Ramon O. Ramirez
*Assistant Examiner*—Jon Szumny
(74) *Attorney, Agent, or Firm*—Locke Liddell & Sapp LLP; Monty L. Ross

(57) ABSTRACT

Extruded polymeric articles useful for supporting, acoustically isolating and vibrationally dampening a pipe segment in relation to a structural support member, the articles having coextruded unfoamed and foamed polymeric layers and being attachable to the structural support member using nails, screws, formed wire hangers or other similarly effective fasteners. A method for making the subject articles and a system comprising a perforated, coextruded acoustic pipe support strap in combination with a shaped wire hanger for use in suspending a pipe segment from the web portion of a laminated joist having an I-beam cross section are also disclosed.

11 Claims, 2 Drawing Sheets

U.S. PATENT DOCUMENTS

| | | | |
|---|---|---|---|
| 5,458,303 A | * 10/1995 | Ruckwardt | 248/74.2 |
| 5,544,849 A | * 8/1996 | Peterson et al. | 248/74.1 |
| 5,588,683 A | * 12/1996 | Schliessner | 37/360 |
| 5,647,563 A | * 7/1997 | Gantner et al. | 248/74.1 |
| 5,702,994 A | * 12/1997 | Klosel | 442/229 |
| 5,890,683 A | * 4/1999 | DePietro | 248/58 |
| 6,012,691 A | * 1/2000 | van Leeuwen et al. | 248/228.3 |
| 6,089,513 A | * 7/2000 | Cau et al. | 248/68.1 |
| 6,098,932 A | * 8/2000 | Olesen | 248/65 |
| 6,126,119 A | * 10/2000 | Giangrasso | 248/58 |
| 6,129,054 A | * 10/2000 | Campbell | 119/856 |
| 6,135,397 A | * 10/2000 | Santa Cruz et al. | 248/74.1 |
| 6,253,794 B1 | * 7/2001 | Riesselmann et al. | 138/177 |

* cited by examiner

EXTRUDED ACOUSTIC PIPE SUPPORT

This is a Division of application Ser. No. 09/475,551 filed on Dec. 30. 1999.

BACKGROUND OF THE INVENTION

1. Field of the Invention

This invention relates to articles useful for attaching metal or plastic pipe to support structures and, more particularly, to extruded articles that support pipe and also provide acoustic and vibrational isolation and dampening to reduce the transmission of sound and vibration to the support structure. The invention also relates to a method for making the extruded acoustic pipe support of the invention.

2. Description of Related Art

The use of strapping or pipe hangers to suspend plastic or metal pipe from support structures such as beams, joists or other framing members is well known. Conventional metal or plastic strapping is typically sold in rolls and can be cut into shorter strips of desired length at the use site. Perforations spaced longitudinally along the strapping are provided for the insertion of fasteners such as nails or screws. More recently, plastic pipe hangers have been introduced comprising a tubular plastic member having one end that is attachable to a support structure and another end with a molded plastic head to which both ends of a plastic strap are secured to form a loop around a pipe.

To reduce the transmission of sound and vibration that sometimes occurs in fluid flow lines from piping to the building support structures, many other pipe clamps have been disclosed that comprise various combinations of metal, plastic and foamed polymeric materials. Such prior art pipe clamps sometimes referred to as "acoustic pipe clamps," are disclosed, for example, in U.S. Pat. Nos. 3,606,218; 3,684,223; 3,802,655; 3,848,839; 4,442,994; 4,934,635; 5,002,243; 5,458,303; and 5,588,683. These conventional acoustic pipe clamps are oftentimes made of more than one part, and when made of plastic, are generally made by injection molding. The use of shaped wire hangers to suspend articles from a vertical wall member is disclosed, for example, in U.S. Pat. No. 3,219,302.

SUMMARY OF THE INVENTION

The pipe support articles of the invention are preferably made in the form of either acoustic pipe clamps or straps having an extruded, substantially unfoamed polymeric skin with a coextruded, foamed polymeric cushioning layer adhered to it. Depending upon the particular configuration, the pipe supports of the invention are preferably extruded in a continuous web that can be cut transversely or slit longitudinally to produce multiple articles from a single continuous extrudate if desired.

Extruded acoustic pipe clamps having relatively complex profiles can be extruded in a laid-open position and then folded around a pipe at predetermined hinge points and secured in that position to produce the finished clamps of the invention. The extruded profile preferably comprises a foamed polymeric cushioning layer adapted to contact the outside surface of a pipe section or segment and a substantially unfoamed plastic skin disposed on that side of the foamed cushioning layer that is opposite the pipe. If desired, cooperatively aligned protrusions and receptacles can be extruded as part of the unfoamed plastic skin. These protrusions and receptacles, when folded into proximity with each other as the clamp is placed around a pipe during installation, can be pressed into frictional engagement with each other to assist in maintaining the pipe support in the desired configuration relative to the supported pipe while attaching the pipe support to a structural support member. The acoustic pipe clamps made in accordance with the present invention can be attached to a structural support member using nails, screws, or any other similarly effective means. The subject acoustic pipe clamps can be attached to a structural support member by inserting fasteners through the clamp in a direction that is either parallel or transverse to a pipe segment supported by the clamp. If desired, the acoustic pipe clamps can be perforated in desired locations by drilling, punching or the like prior to inserting the fasteners through the clamps.

Alternatively, pipe support members in the form of straps having a smooth, unfoamed plastic side and an adhered, foamed polymeric side can be made, for example by continuously coextruding a web or webs having a total width equal to several strap widths that is slit or split longitudinally, for example, to produce narrower straps that can be rolled for packaging and subsequently cut to a desired length at the use site. If desired, the coextruded straps can be perforated longitudinally after exiting the extruder but prior to rolling and packaging. Extruded acoustic pipe supports of this type can be installed directly to beams, joists or other structural framing members using nails, screws or other similarly satisfactory fasteners inserted through cooperatively aligned perforations on oppositely disposed ends of a strap segment.

According to one particularly preferred embodiment of the invention, an acoustic pipe support system is disclosed herein that comprises an extruded acoustic pipe support strap in combination with a formed wire hanger having one end that is insertable through perforations near opposed ends of the strap to form a loop capable of supporting a pipe segment, and a second end that is insertable through the intermediate web portion of a composite support member such as a laminated joist having an I-beam cross-section to suspend the looped strap and the pipe segment supported by the strap.

BRIEF DESCRIPTION OF THE DRAWINGS

The apparatus of the invention is further described and explained in relation to the following figures of the drawings wherein.

DESCRIPTION OF THE PREFERRED EMBODIMENTS

Figure 1:
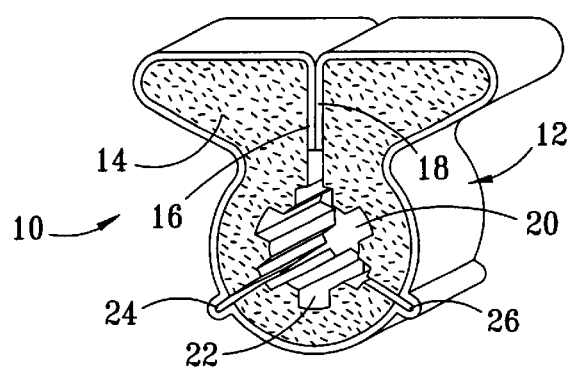
FIG. 1 is a perspective view of one preferred embodiment of the extruded acoustic pipe clamp of the invention when folded into the position as it would be when clamped around a pipe prior to attachment to a support member.

Preferred embodiments of the article, system and method of the invention are more completely described and explained in this section in relation to the referenced figures of the drawings. The pipe support members described herein are principally of two preferred types, the "acoustic pipe clamp" and the "acoustic pipe support strap." Although these structures are not considered to be limitative, they are representative of the articles that can be made in accordance with the present invention, and both embody a "structural side" or layer and a "cushioning foam side" or layer that are desirably coextruded in a continuous method of manufacturing that is also described in greater detail herein. Both the structural side and the cushioning foam side are preferably made of extrudable polymeric materials. Although the same polymeric materials are not necessarily used for each side or layer, with a more rubbery or elastomeric material being generally preferred for use as the cushioning foam side, the materials used to form the two layers are preferably compatible in the sense that they can be thermally bonded during the coextrusion process or, less desirably, bonded by the addition of a bonding agent between the two layers during the extrusion process. In either case, it will be understood and appreciated that the extrudable polymeric materials can also contain other conventional additives or additive packages that are known in the industry. The foamed polymeric material can also be made, for example, by including known nucleators within the formulation, by gas injection, or by other similarly effective means.

The term "acoustic," as used in relation to "acoustic pipe clamp," "acoustic support strap" or similar terminology in this application, refers to the ability of the foamed cushioning material to isolate, insulate, dampen or deaden audible or inaudible vibrations or sounds emanating from a pipe supported by the article when the cushioning layer is placed in contact with a section of the pipe that is not otherwise touching either the unfoamed layer of the article or the structural support member to which the clamp or strap is attached.

One significant advantage of the invention is that the subject acoustic pipe clamps can be made by continuously extruding a web having a desired profile with coextruded foamed and unfoamed layers. The extruded web can be cut into sections having a desired thickness by a flying cutter on the extrusion line and later folded around a pipe segment along predetermined fold lines at the use site to acoustically isolate and vibrationally dampen the pipe relative to a structural support member to which the clamp is attached.

Another significant advantage of the invention is that a system is provided whereby an extruded polymeric strap having a coextruded foam cushioning layer and longitudinally spaced perforations can be wrapped around a pipe segment and suspended from a formed wire hanger attachable to a structural member such as a laminated joist having a cross-sectional configuration similar to that of an "I-beam."

Figure 2:
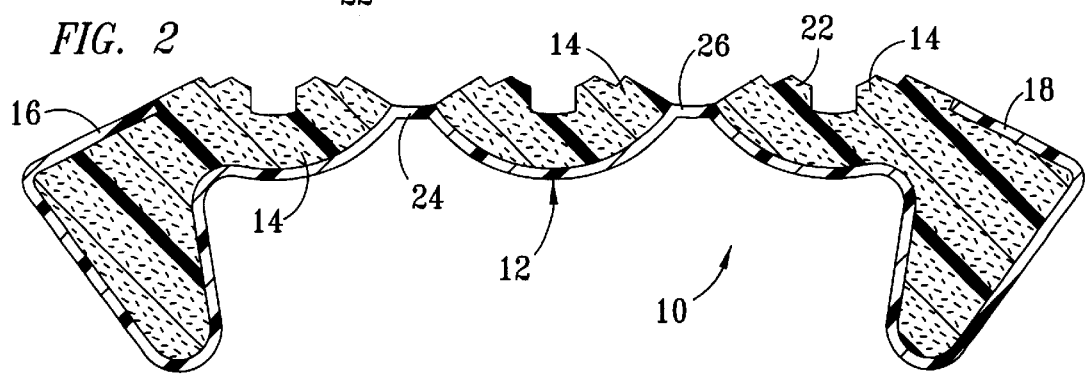
FIG. 2 is a cross-sectional front elevation view of the acoustic pipe clamp of FIG. 1 in the laid-open position in which it is extruded during manufacture according to the method of the invention.
Figure 5:
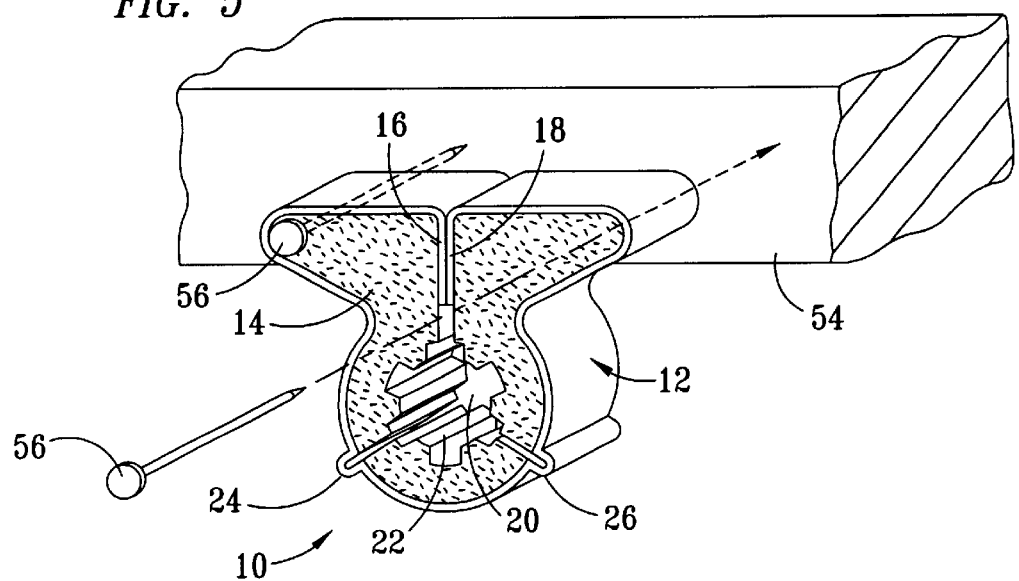
FIG. 5 is a perspective view showing the acoustic pipe clamp of FIGS. 1 and 2 when folded into the use position and attached to a support member using nails as fasteners, with the fasteners being inserted through the foamed polymeric cushioning section disposed inside the peripherally extending plastic skin of the clamp in a direction that is generally parallel to a pipe (not shown) supported by the clamp.

Referring to FIGS. 1, 2 and 5, acoustic pipe clamp 10 of the invention preferably comprises an extruded thermoplastic structural layer 12 having sufficient strength, toughness and flexibility to maintain its structural integrity during installation and to support a pipe segment containing a flowing fluid throughout the intended service life. Acoustic pipe clamp 10 is desirably attachable to a structural support member such as a beam, joist or other structural frame member of a building by the use of conventional fasteners such as nails or screws.

The thermoplastic resin selected for use in making structural layer 12 will preferably be an extrudable thermoplastic polymer, copolymer or terpolymer that will resist crazing, cracking, softening or other failure or dimensional distortion when subjected to a temperature range as will likely be encountered under the conditions of intended use. A second layer 14 of foamed polymeric material is desirably coextruded onto structural layer 12 to cushion a pipe segment (not shown) to be supported by acoustic pipe clamp 10. The thickness of second layer 14 can be variable as seen in FIG. 2 to provide reinforcement to structural layer 12 and also to create an irregular surface 22 that will face inwardly to define opening 20 through which a pipe segment (not shown) can pass and be supported during use. An irregular surface 22 desirably provides support to a pipe segment without more complete surface contact that would increase the transmission of sound or vibrations through the cushioning layer to a structural support member such as joist 54, visible in FIG. 5.

Preferred extrudable thermoplastic materials for use in making structural layer 12 include, for example, polyolefins and other similarly satifactory extrudable thermoplastic polymers. Preferred coextrudable polymeric materials useful for making second layer 14 of acoustic pipe clamp 10 include extrudable elastomeric thermoplastic polymers. Rubber-modified polymeric materials are particularly desirable for use in making second layer 14 of the invention because of the greater flexibility they impart to the extruded polymer.

A particular benefit of acoustic pipe clamp 10 as compared to those disclosed in the prior art is that it can be manufactured by a continuous extrusion process in a position in which it is "laid open" in a relatively flat configuration (FIG. 2) as compared to the shape of the clamp as installed during use (FIG. 5). The relatively flatter configuration as seen in FIG. 2 facilitates cooling of the extrudate and faster extrusion rates, thereby increasing production during a given period. As viewed in FIG. 2, a cross-sectional view that is transverse to the direction of extrusion, no second cushioning layer 14 is extruded over structural layer 12 along predetermined fold lines 24, 26. The absence of cushioning material along fold lines 24, 26 facilitates folding acoustic pipe clamp 10 from the relatively flat position shown in FIG. 2 to the use position shown in FIGS. 1 and 5. In the folded position, segments 16, 18 of structural layer 12 are placed in facing and abutting contact after being "wrapped" around a pipe segment. As shown in FIG. 5, acoustic pipe clamp 10 can be attached to joist 54 by inserting fasteners such as nails 56 through second layer 14, thereby supporting a pipe segment (not shown) passing through opening 20 in relatively fixed relation to joist 54 while simultaneously dampening any sound or other vibration emanating from the pipe segment. It will be appreciated that the number of fold lines, if any, that are present in a given profile can vary according to factors such as the size, shape and thickness of a particular pipe clamp, the size of the internal opening, the materials used, the cell size and density of the polymeric foam, and the like.

Figure 3:
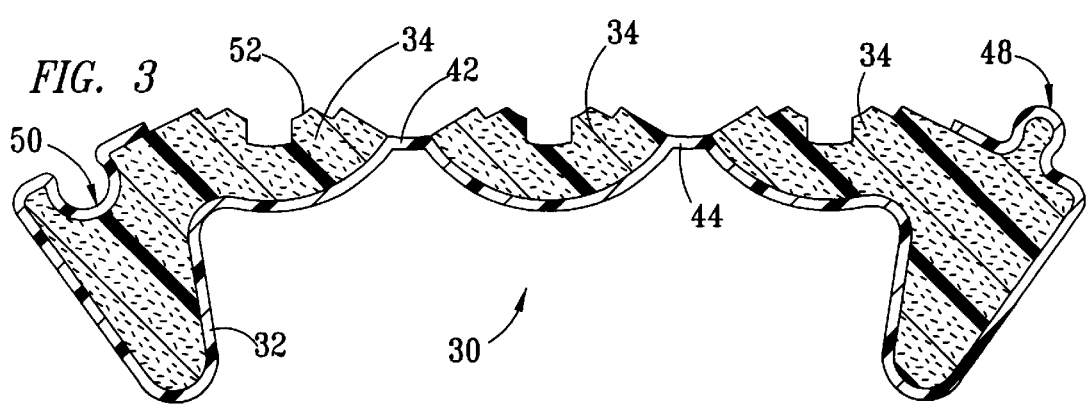
FIG. 3 is a cross-sectional front elevation view of the acoustic pipe clamp of FIG. 4 in the laid open position in which it is extruded during manufacture according to the method of the invention, and differs from the embodiment of FIGS. 1 and 2 in that a protrusion and cooperatively aligned recess are provided in oppositely disposed parts of the clamp to facilitate frictional engagement therebetween when the opposed portions are folded into facing alignment as shown in FIG. 4.
Figure 4:
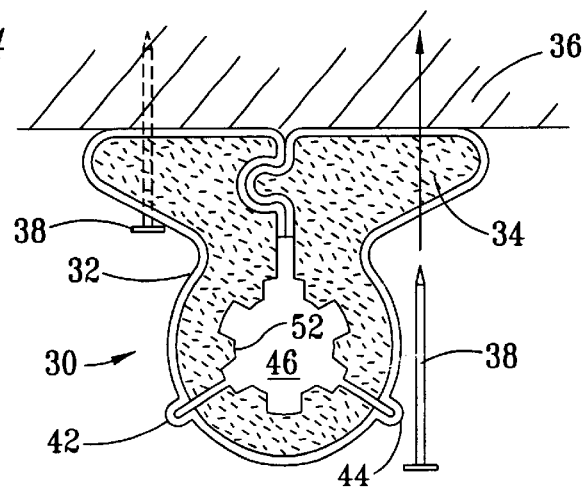
FIG. 4 is a front elevation view showing the acoustic pipe clamp of FIG. 3 when folded into the use position and attached to a support member using nails as fasteners, with the fasteners being inserted through the outer skin of the clamp in a direction that is generally transverse to a pipe (not shown) supported by the clamp.

Referring to FIGS. 3 and 4, another embodiment of the invention is disclosed that is very similar to that described above in relation to FIGS. 1, 2 and 5 except that additional structurally significant features are provided in the extruded profile that greatly facilitate attachment of the acoustic pipe clamp around a pipe segment prior to attaching the clamp to a structural support member. Acoustic pipe clamp 30 preferably comprises a first structural polymeric layer 32 and three sections of a cushioning polymeric layer 34 separated by unfoamed sections 42, 44 that serve as fold lines when clamp 30 is secured around a pipe segment to be supported from a structural support member of a building such as a beam or joist 36. Opening 46 as seen in FIG. 4 is defined by surface portions 52 of cushioning layer 34, the geometry of which is determined by the configuration of the extruder die. According to this embodiment of the invention, a protrusion 48 is part of the extruded profile and, on the opposite end of the profile, a cooperatively shaped recess 50 is provided to receive and frictionally engage protrusion 48 when clamp 30 is folded at unfoamed sections 42, 44. Taken together, protrusion 48 and recess 50 serve as a releasable "latch" that can be used to hold clamp 30 in place around a pipe segment while clamp 30 is attached to a structural support member 36 by nails 38 as shown in FIG. 4 or by any other similarly useful fastener.

By comparing the attachment of acoustic pipe clamp 30 to structural support member 36 as shown in FIG. 4 to the attachment of acoustic pipe clamp 10 to structural support member 54 as shown in FIG. 5, it will be appreciated that fasteners can be inserted through both the structural and cushioning layers of the respective clamps or through only the cushioning layer when attaching the clamps to a structural support. With the method of attachment shown in FIG. 4, the fasteners may be more difficult to insert that with the method depicted in FIG. 5, because the fasteners must penetrate the more dense material of the structural layer. A stronger and more rigid support is likely provided, however, with the method of attachment depicted in FIG. 4. When the method of attachment shown in FIG. 4 is preferred, insertion of fasteners can be facilitated by pre-punching or otherwise perforating at least the structural layer in desired locations during the manufacturing process.

In addition to the embodiment described above, it will be appreciated by those of ordinary skill in the art upon reading this disclosure that a similarly effective acoustic pipe clamp can be made in accordance with the invention by extruding a profile having a first unfoamed layer and a second foamed cushioning layer that directly contacts a pipe segment and is attachable to a structural support member without being wrapped completely around the supported pipe. When made according to this embodiment of the invention, the extruded pipe clamp will not have unfoamed foldable sections as previously described because it is not folded around the pipe segment. With this embodiment, conventional fasteners are used to secure the clamp to the structural support member as previously described, with the principal difference being that an air gap exists between the structural support member and that portion of the supported pipe segment that is not contacted by the foamed cushioning material or any other part of the acoustic pipe clamp. This structure is more similar to many conventional acoustic pipe clamps except that the conventional clamps do not comprise coextruded first and second polymeric layers as disclosed herein.

According to yet another embodiment of the invention, acoustic pipe clamps that are similarly useful for applications where the weight to be supported is not great can be made by extruding only the foamed polymeric cushion portion of the subject clamp without the unfoamed first layer. In this case, fasteners are inserted through the foamed polymeric layer and then attached to the structural support member.

Figure 6:
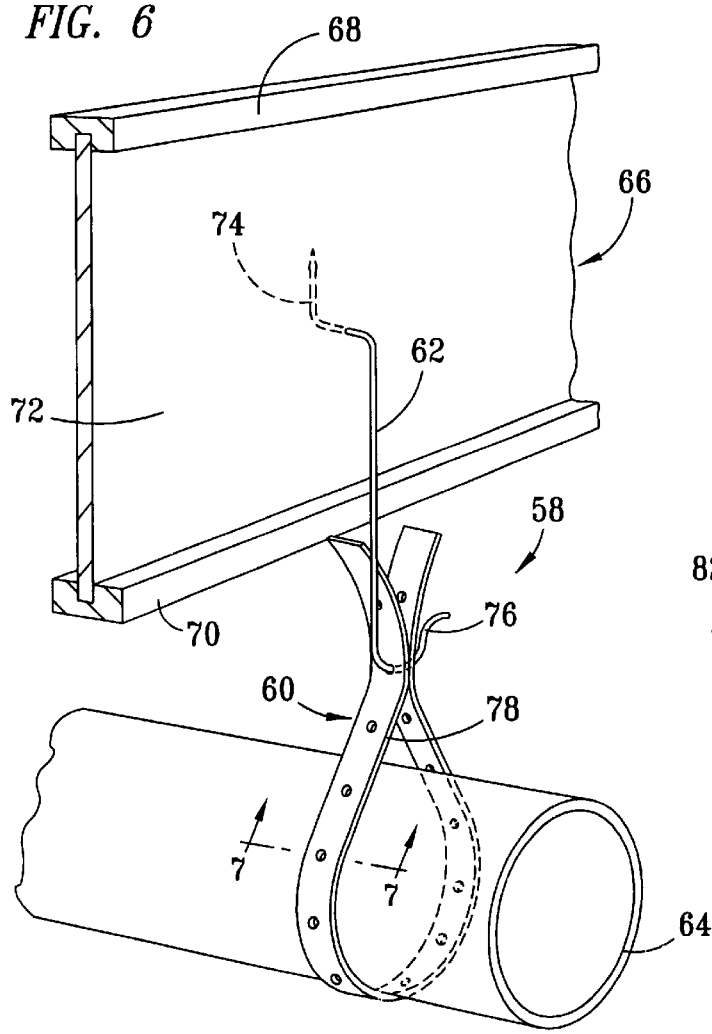
FIG. 6 is a perspective view showing another embodiment of the acoustic pipe support of the invention as it can be used in combination with a shaped or formed metal hanger to support a pipe section suspended from a support beam such as a laminated joist made of wood or other composite building materials.
Figure 7:
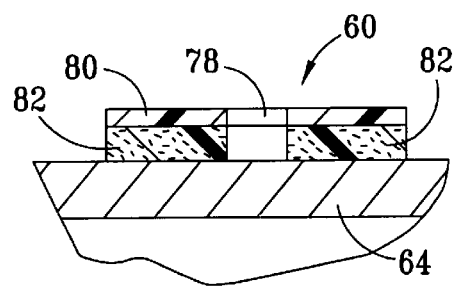
FIG. 7 is a cross-sectional side elevation view taken along line 7—7 of FIG. 6 showing the acoustic pipe support of the invention in contact with a pipe section.

Referring to FIGS. 6 and 7, another acoustically isolated and vibrationally dampened pipe support system is disclosed that preferably comprises an acoustic pipe support strap in combination with a formed metal hanger suitable for attachment to a structural support member such as a laminated composite I-beam joist 66 comprising opposed, parallel flange members 68 joined by web 72. Pipe support system 58 preferably comprises acoustic pipe support strap 60 and formed wire hanger 62. Acoustic pipe support strap 60 preferably comprises a first structural thermoplastic layer 80 and a coextruded foamed polymeric cushioning layer 82. A plurality of longitudinally spaced perforations 78 are desirably provided in pipe support strap 60 for use in attaching strap 60 to hook member 76 of formed wire hanger 62. The shape of wire hanger 62 above hook member 76 is preferably such that opposed end section 74 is insertable by conventional means such as hammering or drilling through web portion 72 of wood composite I-beam 66 in such manner that end section 74 will not be pulled back through web 72 accidentally by the supported weight of pipe segment 64.

Structural layer 80 and cushioning layer 82 are preferably made of materials such as those described above. A plurality of straps 60 can be produced continuously by coextruding a wider web of material that is slit in the flow direction to produce a plurality of longer straps and then rolled and/or cut to a desired length. Perforations 78 can be made by continuously punching or drilling the straps exiting the extruder, or later, as desired. Alternatively, a plurality of straps can be made by a single set of extruders by splitting the flow of plastic prior to exiting the extruder die.

According to the method of the invention, acoustic pipe clamps and pipe support straps are made using at least two extruders to coextrude webs having a thermoplastic structural layer and a polymeric foam layer bonded together to form a single extrudate. In some instances it can be desirable to lay down a third layer of bonding material between the structural and foamed layers using additional apparatus, but most preferably, the polymeric materials used for the two layers are compatible and will thermally bond to form a unitary extrudate. Flying cutters or other devices known to those of skill in the art can be used to sever the extruded web transversely either prior to or subsequent to cooling, and slitters can be used divide the extruded web into longitudinally extending straps as desired.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. An article attachable to a structural member of a building for supporting a pipe segment therefrom, the article comprising an extruded body having a first layer comprising a web of unfoamed thermoplastic material with at least one fold line and a coextruded second layer of foamed polymeric cushioning material of variable thickness adhered to the first layer over at least a portion of the web, the extruded body being foldable around the pipe segment, with the variable thickness second layer providing interrupted contact with the pipe segment away from the fold line; and at least one fastener attachable to both the foamed polymeric cushioning material and to the structural member.

2. The article of claim 1 wherein the pipe segment has a circumference and wherein a portion of the circumference is not contacted by the article or by the structural support member.

3. The article of claim 1 wherein the extruded body is made foldable by reducing the thickness of the second layer relative to the first layer in the area of the fold.

4. The article of claim 1 wherein the extruded body is made foldable by making the second layer discontinuous along predetermined fold lines in the first layer.

5. The article of claim 1 wherein the first layer is made of a material selected from the group consisting of extrudable polyolefin polymers.

6. The article of claim 1 wherein the second layer is made of a material selected from the group consisting of extrudable elastomeric polymers.

7. The article of claim 1 wherein the extruded body further comprises at least one protrusion and at least one oppositely disposed recess, and wherein the protrusion and recess are foldable into frictional engagement with each other to surround the pipe segment.

8. The article of claim 1 wherein the extruded body has first and second end sections that are foldable into abutting contact with each other to make a pipe clamp.

9. The article of claim 1 wherein the fastener is selected from the group consisting of nails, screws and formed wire fasteners.

10. A system useful for supporting a pipe segment from a structural member of a building, the system, comprising:

a pipe support member having an extruded body with a thermoplastic outer skin and a coextruded foamed polymeric layer of variable thickness bonded to the skin, the pipe support member being foldable around the pipe segment to define an irregular opening for the pipe segment, the opening being disposed inwardly of the foamed polymeric layer; and at least one fastener attachable to both the structural member and the foam polymeric layer.

11. The system of claim 10 wherein the fastener is selected from the group consisting of nails, screws and shaped wire fasteners.

* * * * *